(12) United States Patent
Potts

(10) Patent No.: US 11,807,194 B2
(45) Date of Patent: Nov. 7, 2023

(54) COLLAPSIBLE CARGO SLIDE ASSEMBLY

(71) Applicant: Paul C. Potts, Elkhorn, NE (US)

(72) Inventor: Paul C. Potts, Elkhorn, NE (US)

(*) Notice: Subject to any disclaimer, the term of this patent is extended or adjusted under 35 U.S.C. 154(b) by 0 days.

(21) Appl. No.: 17/716,666

(22) Filed: Apr. 8, 2022

(65) Prior Publication Data

US 2023/0322162 A1 Oct. 12, 2023

(51) Int. Cl.
*B65G 67/04* (2006.01)
*B60R 9/06* (2006.01)
*B65G 67/24* (2006.01)

(52) U.S. Cl.
CPC ............. *B60R 9/06* (2013.01); *B65G 67/04* (2013.01); *B65G 67/24* (2013.01)

(58) Field of Classification Search
None
See application file for complete search history.

(56) References Cited

U.S. PATENT DOCUMENTS

| | | | | |
|---|---|---|---|---|
| 2,808,159 A * | 10/1957 | Beltran Simo | ....... | B60P 1/6454 414/499 |
| 3,883,923 A * | 5/1975 | England | ................. | A47B 91/06 248/188.9 |
| 4,877,281 A * | 10/1989 | Altmann | ................... | B60R 5/04 383/66 |
| 5,624,223 A * | 4/1997 | Lovato | .................... | B60P 1/006 414/522 |
| 5,836,593 A * | 11/1998 | Skinner | ................... | B65G 7/02 280/20 |
| 6,578,896 B1 * | 6/2003 | Peterson | ............... | B60R 13/011 296/97.23 |
| 7,338,104 B1 * | 3/2008 | Bejin | ................. | B62D 33/0273 224/403 |
| 8,096,566 B2 * | 1/2012 | West | ..................... | B62B 15/008 16/24 |
| 8,635,742 B2 * | 1/2014 | Smith | ...................... | B65G 7/12 280/18 |
| 8,662,559 B2 * | 3/2014 | Wise | ....................... | B60R 13/01 296/39.1 |
| 8,840,166 B1 * | 9/2014 | Derbes | .................... | B60R 5/041 224/403 |
| 9,033,642 B2 * | 5/2015 | Pike | .......................... | B60P 1/38 414/522 |
| 9,545,865 B2 * | 1/2017 | Lindgren | ................ | B60P 1/003 |
| 10,059,361 B2 * | 8/2018 | Weisbrod | ........... | B65D 19/0002 |
| 10,647,267 B2 * | 5/2020 | Briggs | .................... | B60R 13/01 |
| 2006/0033377 A1 * | 2/2006 | Frimel | ................... | B60P 1/003 298/1 A |
| 2015/0125256 A1 * | 5/2015 | Bemis | ....................... | B60P 1/38 414/809 |

* cited by examiner

*Primary Examiner* — Mark C Hageman
(74) *Attorney, Agent, or Firm* — Ryan T. Grace; Advent, LLP

(57) ABSTRACT

A collapsible cargo slide assembly that protects a cargo area from damage during loading and unloading of cargo. The assembly includes a plurality of panels with each panel including a generally planar slider having a surface smoothed for sliding on the cargo area, a block of compressible material for contact with the cargo. The assembly further includes a connector that joins a panel and an adjacent panel. In embodiments, the connector is a layer of flexible material that substantially spans across at least the panel and the adjacent panel. In embodiments, each panel includes a protruding lip having one or more apertures configured to receive a securing device for fastening cargo to the panel.

17 Claims, 7 Drawing Sheets

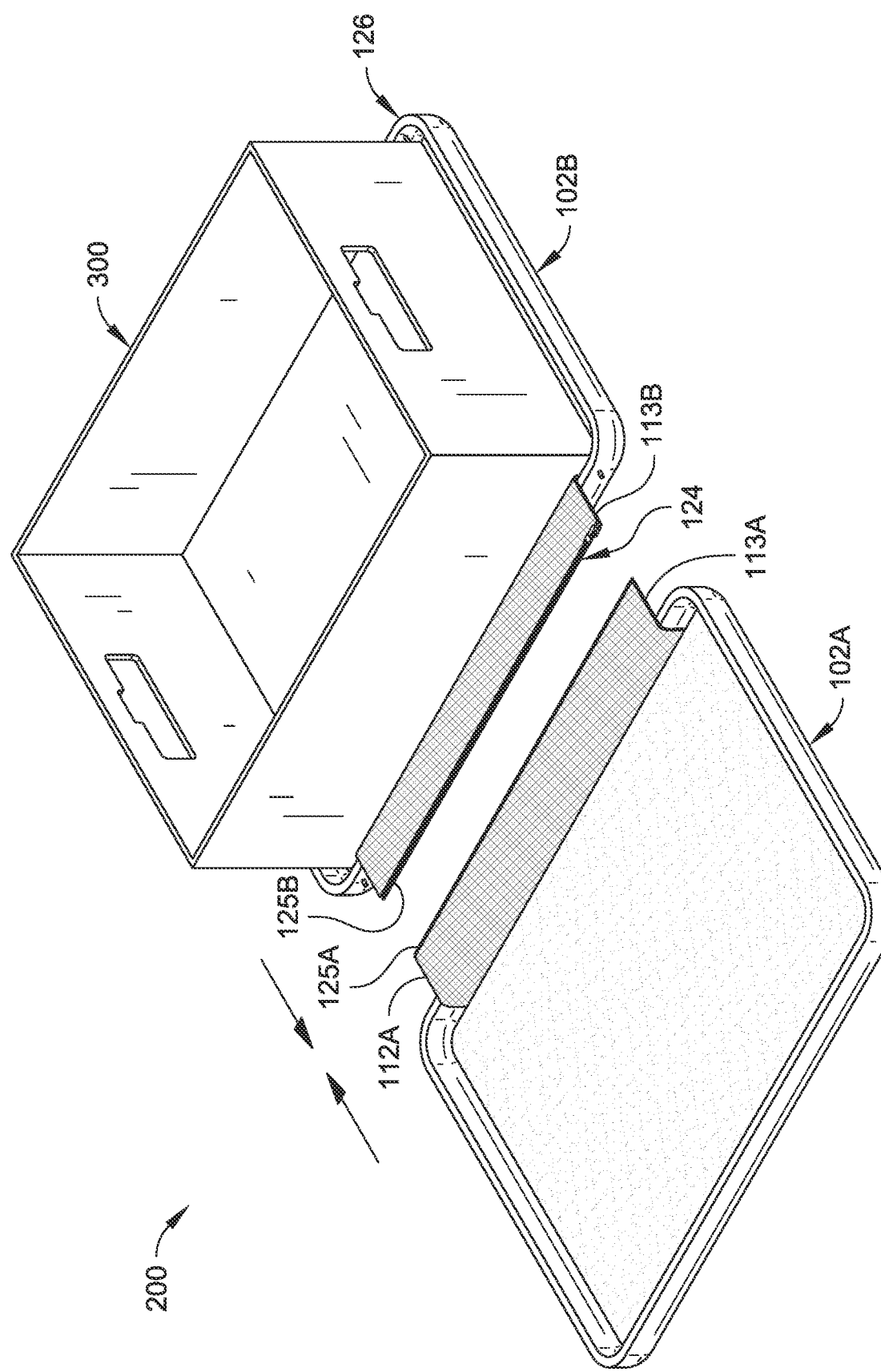

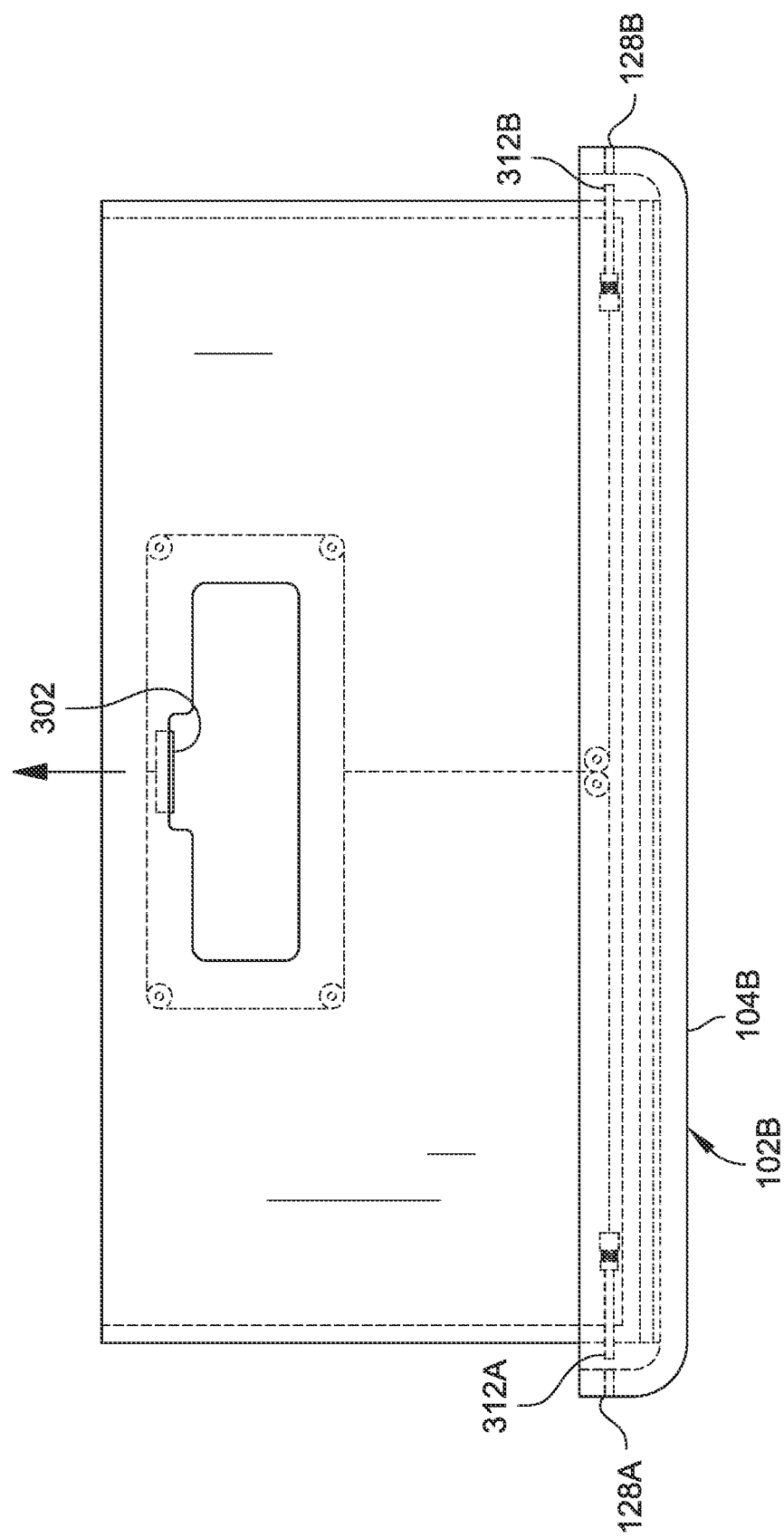

COLLAPSIBLE CARGO SLIDE ASSEMBLY

BACKGROUND

Truck beds are a designated space and platform on a truck for transporting cargo from one place to another. Truck beds are generally open-air regions encapsulated by a pair of sidewalls, a passenger cabin, and a tailgate. The tailgate of the truck is a hinged flap that can be lowered or removed when loading or unloading cargo. In some instances, the tailgate may serve as a platform for supporting various types of loads, however, the general function of the tailgate is to facilitate unobstructed horizontal access to the truck bed. As cargo is loaded or unloaded on the truck bed, a user may reposition the cargo on the truck bed by sliding the cargo along a surface of the truck bed. To secure the cargo for transportation, various types of lashings (e.g., ropes, tie-downs, rachet straps, etc.) may be employed by anchoring the lashings to one or more loops located on the truck bed, placing the cargo between the lashings and the truck bed, and then increasing tension on the lashing so as to restrict the cargo from sliding on the truck bed.

BRIEF DESCRIPTION OF THE DRAWINGS

The Detailed Description is described with reference to the accompanying figures. The use of the same reference numbers in different instances in the description and the figures may indicate similar or identical items. The drawings are not necessarily to scale.

FIG. 5 is a perspective view illustrating a set of selectively interlocking panels for a collapsible cargo slide assembly, such as the collapsible cargo slide assembly illustrated in FIG. 1, in accordance with example embodiments of the present disclosure.

FIG. 6B is another side elevation view of the panel and the crate illustrated in FIG. 6A, wherein the lock pin is illustrated in a disengaged state.

DETAILED DESCRIPTION

Figure 1:
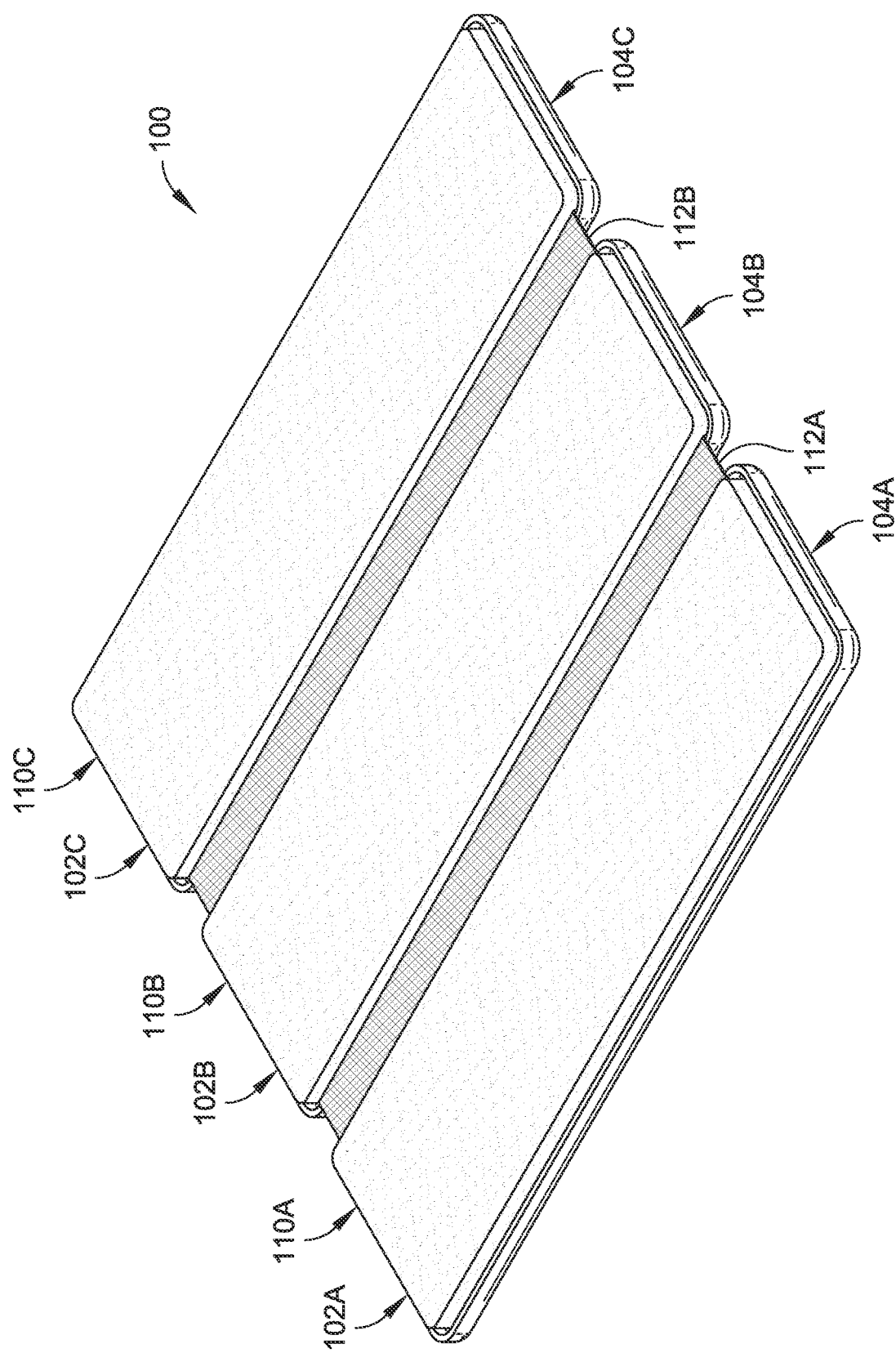
FIG. 1 is a perspective view illustrating a collapsible cargo slide assembly in accordance with an example embodiment of the present disclosure.

While the embodiments of the present application are susceptible to various modifications and alternative forms, specific embodiments thereof have been shown by way of example in the drawings and are herein described in detail. However, it should be understood that the description herein of specific embodiments is not intended to limit the application to the particular embodiment disclosed, on the contrary, the intention is to cover all modifications, equivalents, and alternatives falling within the spirit and scope of the present application as defined by the appended claims. It should be noted that the articles "a," "an," and "the," as used in this specification, include plural referents unless the content clearly dictates otherwise. Additional features and functions are illustrated and discussed below.

Overview

Frequent use of a truck bed inevitably leads to scratches on the truck bed. If the truck bed does not have a protective surface that is capable of withstanding the scratches, then the scratches may penetrate a clear coat, paint, and primer layers of the truck bed, potentially exposing a substrate metal layer to weather elements, which leads to corrosion and eventual structural failure. Several developments to truck beds have been devised to prevent scratches to the truck bed, such as rubber or plastic bed mats, rubber or plastic drop-in bed liners, rug liners, impact-resistant spray coatings, and truck bed organizers. However, each of these developments comes with corresponding disadvantages. For example, scratches on the plastic bed mats and plastic bed liners can still become a cosmetic nuisance for truck owners since the scratches become permanently embedded in the plastic. Rubber bed mats and rubber bed liners are able to withstand some scratches without deforming, but the rubber material can make sliding and positioning cargo into the truck bed more difficult due to the rubber's coefficient of friction as compared to a plastic surface, and, in some instances, sliding of the cargo against the rubber may cause the rubber bed mat or rubber bed liner to rip. Spray coatings can be a costly and permanent solution, however, replacing a damaged coating only further adds to its cost. Truck bed organizers offer the added benefit of compartments and/or partitions to the truck bed, however, this comes with the disadvantage of reduced allowable cargo sizes since some items, such as furniture, cannot fit inside the compartments and partitions.

Furthermore, cargo placed in a truck bed distal from a tailgate requires a user to climb onto the truck bed in order for the user to reach the cargo, which adds additional time and exertion for the user to move the cargo in and out of the truck bed.

Accordingly, the present disclosure is directed to a collapsible cargo slide assembly that allows a user to load and unload cargo into the truck bed with ease by allowing the user to slide the cargo into position on the truck bed without having to climb in and out of the truck bed, and further protects the truck bed from damage from positioning the cargo. The cargo slide assembly comprises a plurality of panels having connectors that join each panel to an adjacent panel, wherein the connectors allow for a user to fold and collapse the cargo slide assembly for compact storage when the cargo slide assembly is not in use. Each panel includes an elongated and planar slider that has a smooth surface that allows the cargo slide assembly to slide against a truck bed without substantially damaging the truck bed. On an opposing surface to the smooth surface, a block of compressible material is disposed on each slider such that, when a piece of cargo is placed on the block, the block compresses and conforms to the piece of cargo, thereby allowing the cargo to resist any sliding relative to the cargo slide assembly.

As a whole, the cargo slide assembly allows a user to place a portion of the cargo slide assembly in a truck bed with the smooth surface of the panels in contact communication with the truck bed, place a piece of cargo on one or more blocks of compressible material associated with the portion of the cargo slide assembly, then slide the cargo and the cargo slide assembly together into a position that is desirable for transport in the truck bed. To unload the cargo, the user slides the cargo and cargo slide assembly towards a tailgate end of the truck, which allows for easy access for the user to remove the cargo from the truck bed. Once the cargo is removed and the cargo slide assembly is no longer needed for transporting the cargo, the user may fold and collapse the cargo slide assembly for compact storage.

In embodiments, the connectors are a hinge. In other embodiments, the connectors are a flexible material. In some instances, the flexible material is configured as a sheet that substantially spans across at least a first panel and an adjacent panel, the sheet located between each block and the respective panel.

In embodiments, one or more connectors are configured to selectively couple a panel to an adjacent panel using a separable fastener (e.g., a zipper, clasping buttons, etc.).

In embodiments, each panel can include a protruding lip having one or more apertures, the one or more apertures configured to receive a securing device for fastening cargo to a respective one or more panels. The securing device can be a lashing or a lock pin. In a further embodiment, a cargo crate that includes the lock pin may be configured to selectively couple the cargo crate to the respective one or more panels. The cargo crate may include a button or lever that is configured to retract the lock pin from the one or more apertures for decoupling the cargo crate from the one or more panels.

Example Implementations

Figure 2:
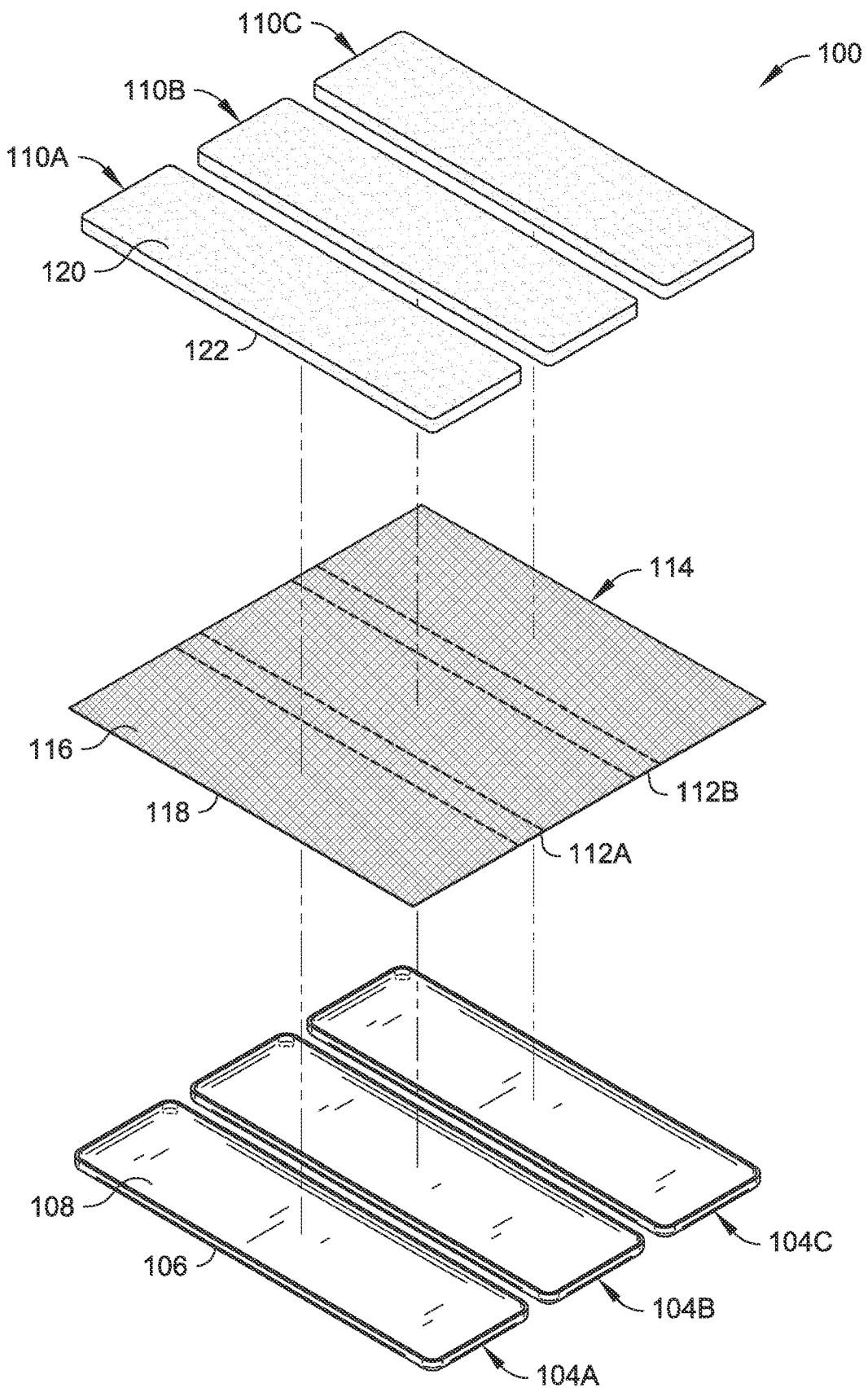
FIG. 2 is an exploded view of a collapsible cargo slide assembly, such as the collapsible cargo slide assembly illustrated in FIG. 1.
Figure 3:
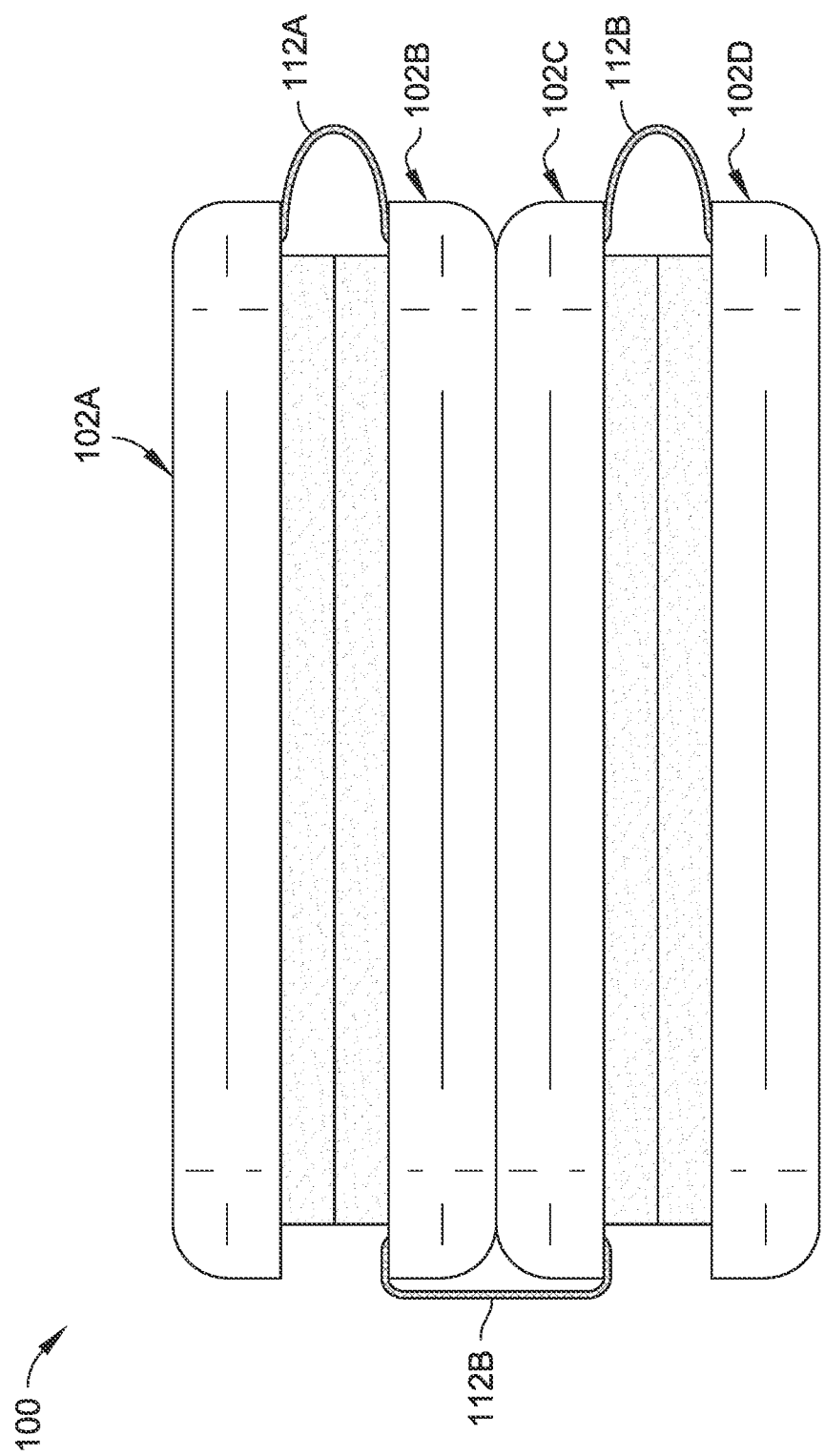
FIG. 3 is a side view of a collapsible cargo slide assembly, such as the collapsible cargo slide assembly illustrated in FIG. 1, arranged in a collapsed configuration for compact storage.

Generally referring to FIGS. 1-3, a collapsible cargo slide assembly 100 (hereinafter referred to as assembly 100) is described in accordance with an embodiment of the present disclosure. In general, assembly 100 includes a plurality of panels and a plurality of connectors, wherein a respective connector joins a panel to an adjacent panel.

In embodiments, the plurality of panels are arranged in a row or column of interconnected panels. For example, in reference to FIG. 1, assembly 100 includes panels 102A-C and connectors 112A-B such that panels 102A-C are arranged in a row such that connector 112A couples panel 102A to panel 102B and connector 112B couples panel 102B to panel 102C.

In general, each panel includes a slider and a block. In embodiments, the sliders (e.g., sliders 104A-C) are each generally planar members composed of a rigid material. The rigid material may include, but is not limited to, plastic, metal, or wood. Each slider has respective opposing surfaces 106 and 108. In embodiments, surface 106 is a smooth surface for sliding against a truck bed. In some embodiments, planar members are elongated.

In embodiments, the blocks (e.g., blocks 110A-C) are composed of a compressible material. In general, the compressible material allows for each block to compress and conform to a piece of cargo due to the weight of the piece of cargo, thus making it difficult for the piece of cargo to slide against the block. In some embodiments, the compressible material may include, but is not limited to, rubber, polystyrene foam, ethylene-vinyl acetate (EVA) foam, or polyurethane foam. In other embodiments, the block can be an impressionable wood that is susceptible to impressions or indentions caused by the weight of the cargo. For example, the block can be made of, but not limited to, pine, cedar, or balsa.

In embodiments, the blocks have a coefficient of friction that is greater than a coefficient of friction of surface 106 of the sliders.

In embodiments, each block is disposed on surface 108 of a respective slider. For example, block 110A is disposed on respective surface 108 of slider 104A, block 110B is disposed on respective surface 108 of slider 104B, and block 110C is disposed on respective surface 108 of slider 104C. In embodiments, each block is coupled to a respective slider using various couplings. As non-limiting examples, each block can be coupled to a respective slider using a mechanical fastener (e.g., bolts, screws, nails, staples, clips, webbing, loops/hooks, etc.) or an adhesive glue.

In general, each connector (e.g., connectors 112A-B) is configured to permit each panel to fold relative to an adjacent panel to allow the cargo slide assembly to collapse for compact storage. For example, in reference to FIG. 3, an example assembly 100 having panels 102A-D interconnected to each other using respective connectors 112A-C is depicted in a collapsed configuration. In this figure, connectors 112A-C allow each respective panel to fold relative to an adjacent panel. In other words, connector 112A is configured to allow panel 102A to fold relative to panel 102B, connector 112B is configured to allow panel 102B to fold relative to panel 102C, and connector 112A is configured to allow panel 102C to fold relative to panel 102D.

In embodiments, the connectors are hinges. For example, the connectors can be, but are not limited to, a pivot hinge, a spring hinge, a barrel hinge, or a living hinge. In other embodiments, the connectors are a flexible material that facilitates bending, folding, or flexing. In embodiments, the flexible material can be configured as, but is not limited to, a sheet, a webbing, a rope, or a cable. The flexible material may be composed of, but is not limited to, rubber, nylon, or metal wire.

In embodiments, the flexible material is configured as a layer that substantially spans across a respective surface 108 of at least two or more sliders such that a portion of the flexible material between adjacent sliders defines a connector. For example, in reference to FIG. 2, an exploded view of an example assembly 100 is depicted as having sliders 104A-C, blocks 110A-C, and layer 114. In this figure, layer 114 is a sheet or webbing of flexible material that is disposed between blocks 110A-C and sliders 104A-C of each panel, wherein layer 114 includes portions that define connectors 112A-B. In embodiments, layer 114 is coupled between the blocks and sliders of each respective panel. For example, in reference to FIG. 2, blocks 110A-C each have respective opposing surfaces 120 and 122, layer 114 has opposing surfaces 116 and 118, and sliders 104A-C each have respective surfaces 106 and 108. Surface 122 of block 110A is coupled to surface 116 of layer 114, and a portion of surface 118 of layer 114 is coupled to surface 108 of slider 104A such that block 110A is disposed on surface 108 of slider 104A; surface 122 of block 110B is coupled to surface 116 of layer 114, and a portion of surface 118 of layer 114 is coupled to surface 108 of slider 104B such that block 110B is disposed on surface 108 of slider 104B; and surface 122 of block 110C is coupled to surface 116 of layer 114, and a portion of surface 118 of layer 114 is coupled to surface 108 of slider 104B such that block 110C is disposed on surface 108 of slider 104C. Furthermore, connectors 112A and 112B are defined by portions of layer 114 that are between adjacent panels. In other words, connectors 112A and 112B are portions of layer 114 not directly in contact with any respective blocks or sliders so as to permit a degree a freedom for layer 114 to bend, fold, or flex.

In embodiments that have more than three panels, the cargo slide assembly may have a plurality of layers wherein each layer spans across at least a respective two panels to define at least one connector. In other words, a first panel and a second panel are connected by a first layer that defines a first connector, the second panel and a third panel are connected by a second layer that defines a second connector. In other embodiments, the cargo slide assembly has a single layer that spans across all the panels of the cargo slide assembly that define a plurality of connectors. For example, assembly 100 in FIG. 2 has layer 114 that spans across all the panels and further defines connectors 112A and 112B.

Figure 4:
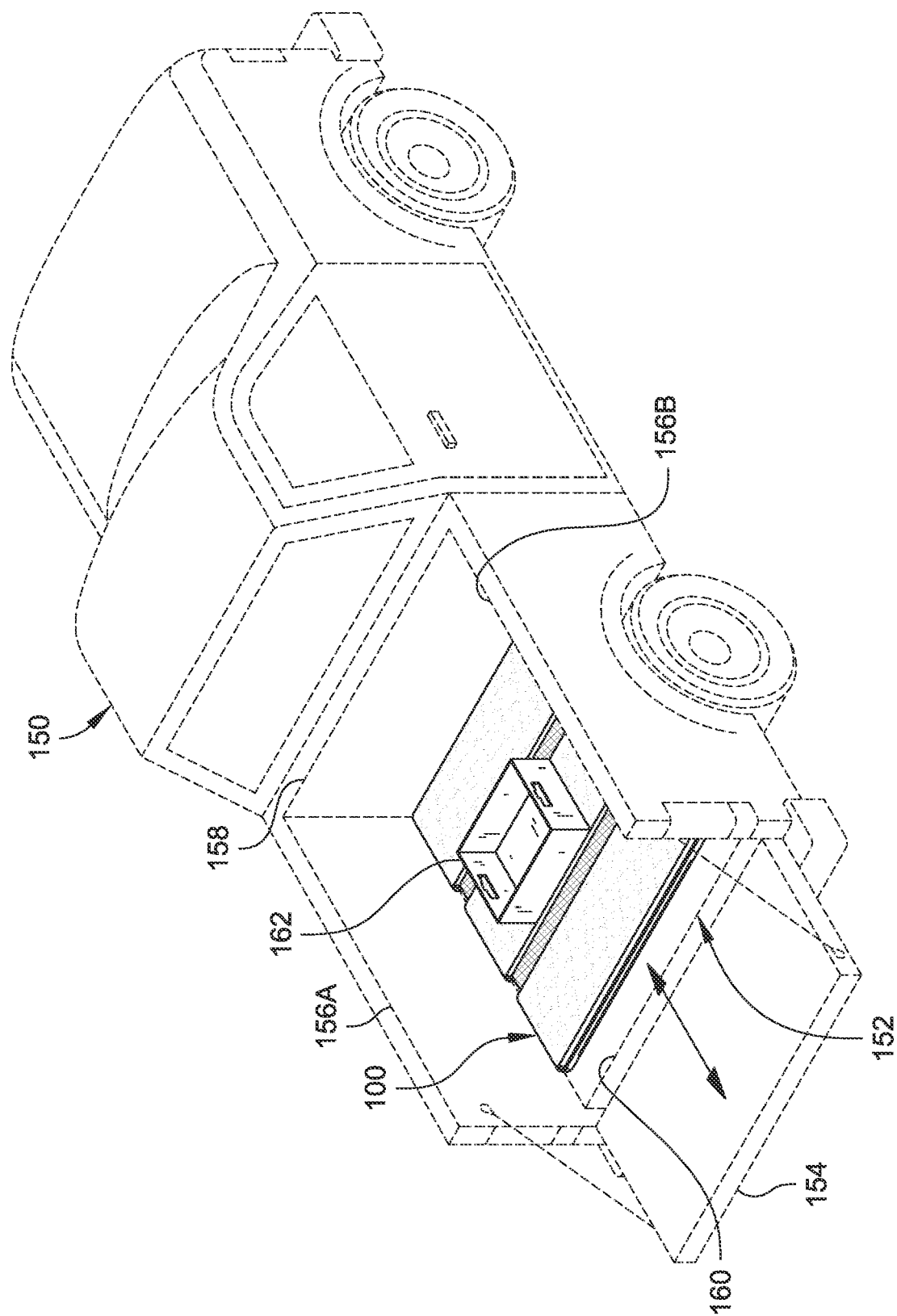
FIG. 4 is a perspective view of a collapsible cargo slide assembly, such as the collapsible cargo slide assembly illustrated in FIG. 1, positioned in a truck bed.

Now referring to FIG. 4, a perspective view of a collapsible cargo slide assembly, such as assembly 100 of FIG. 1, is positioned in a truck bed for transporting a piece of cargo. In this figure, truck 150 has truck bed 152 for containing and transporting cargo 162. In general, truck bed 152 is an open-air storage region defined by opposing sidewalls 156A-B, cabin wall 158, tailgate 154, and bed surface 160. Tailgate 154 is a hinged flap that can be selectively lowered or removed when loading or unloading cargo. In FIG. 4, tailgate 154 is in a lowered position, assembly 100 is positioned on truck bed 152 such that the sliders of assembly 100 are in contact with bed surface 160, and cargo 162 is resting on the one or more blocks (e.g., blocks 110A-C) of assembly 100. By having tailgate 154 in the lowered position, a user can easily slide assembly 100 (which supports cargo 162) along bed surface 160 to allow the user improved access in loading and unloading cargo 162 from truck bed 152.

While FIG. 4 illustrates an example use of the collapsible cargo slide assembly in a truck bed of a truck, it should be appreciated by those in the art that the collapsible cargo slide assembly may be used with any cargo or stowage area of any vehicle. For example, truck bed 152 may be a cargo bed of a moving van, a cargo bed of a flatbed truck, a cargo bed of an 18-wheeler trailer, a truck space of a sport utility vehicle (SUV), or a cargo space of an aircraft or a boat.

In embodiments, the cargo slide assembly may have dimensions that coincide with the geometry of truck bed 152 (depending on the make and model of truck 150) so as to minimize any sliding by cargo slide assembly within the region defined by truck bed 152. For example, in FIG. 4, assembly 100 has dimensions such that assembly 100 coincidently fits within a region defined between side walls 156A-B, cabin wall 158, and tailgate 154.

Now referring to FIG. 5, a perspective view illustrating example panels 200 for a collapsible cargo slide assembly, such as the collapsible cargo slide assembly of FIG. 1.

In embodiments, one or more connectors are configured to selectively couple a panel to an adjacent panel. In this embodiment, each connector is composed of a first portion and a second portion configured to selectively couple to each other according to a separable fastener having a first comember and a second comember respective to the first portion and the second portion. For example, in reference to FIG. 5, panels 102A and 102B have connector 112A, wherein connector 112A includes portions 113A and 113B that have respective comembers of 125A and 125B of separable fastener 124. The separable fastener 124 can be, but is not limited to, a zipper system, a clasping button system, a hook and loop system, or an aperture and mechanical fastener system. In FIG. 5, separable fastener 124 is a zipper.

In embodiments, a slider of a respective one or more panels has a protruding lip having one or more apertures that are configured to receive a securing device for fastening cargo to the one or more panels, wherein the securing device is a lashing or a lock pin. The lashing can be, but is not limited to, a rope, cable, or strap. In reference to FIGS. 5, 6A, and 6B, slider 104B of panel 102B has protruding lip 126, wherein protruding lip 126 has one or more apertures (e.g., aperture 128A and 128B) configured for receiving one or more respective lock pins (e.g., lock pins 312A and 312B) that pass at least a portion through crate 300, thereby securing crate 300 to panel 102B. To decouple crate 300 from panel 102B, a user simply removes lock pins 312A-B from respective apertures 128A-B.

Figure 6A:
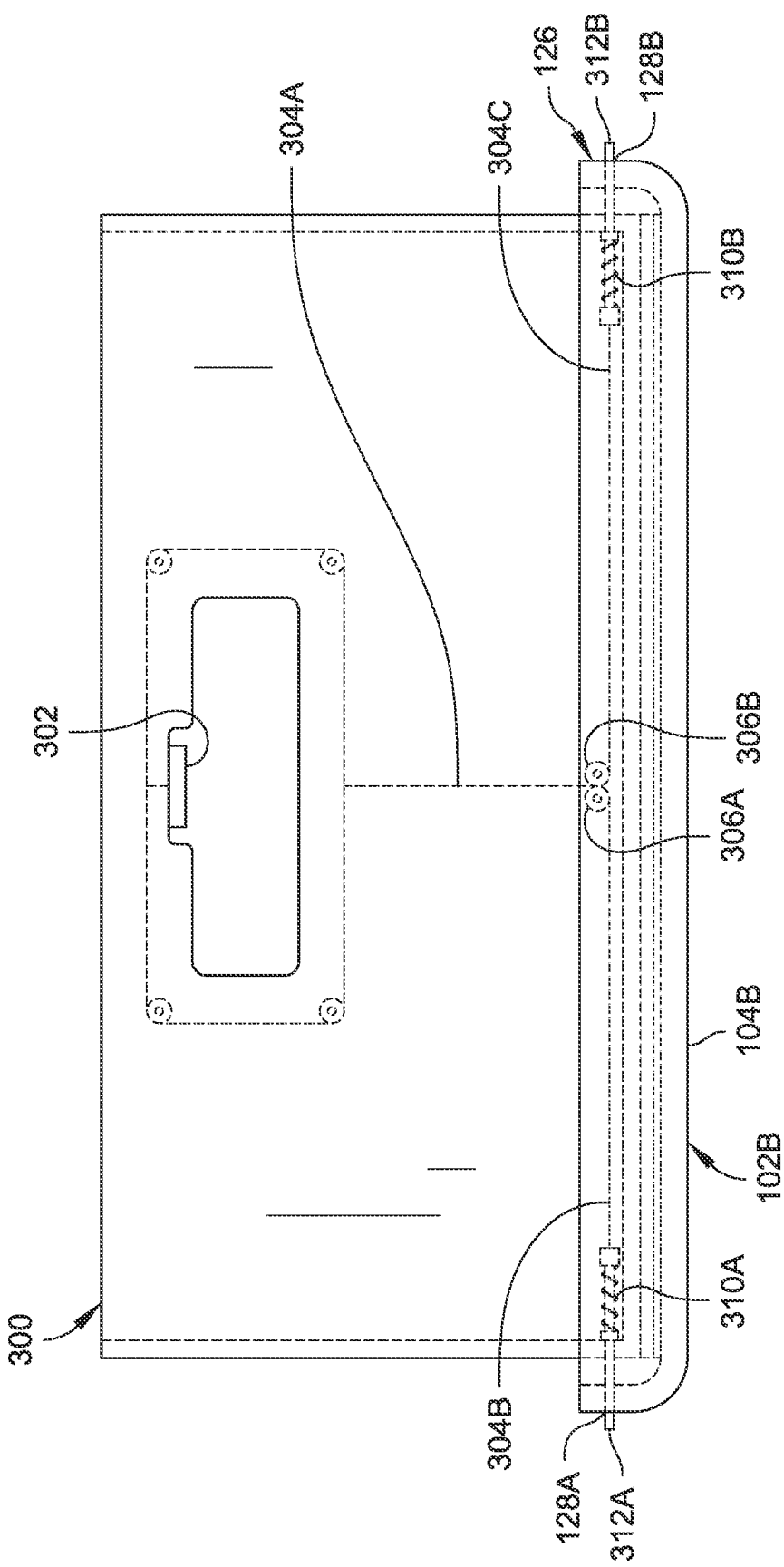
FIG. 6A is a side elevation view of a panel and a crate for a collapsible cargo slide assembly, such as the collapsible cargo slide assembly illustrated in FIG. 1, the crate configured to selectively couple to the panel using a lock pin, the lock pin illustrated in an engaged state, in accordance with example embodiments of the present disclosure.

In embodiments, crate 300 includes one or more lock pins, wherein the one or more lock pins are spring-biased to engage the respective one or more apertures so as to selectively couple the crate to the panel. For example, the lock pin can be configured as a push-button spring clip. In a further embodiment, crate 300 includes a button or lever configured to retract the spring-biased lock pin from the one or more apertures for decoupling the crate from the panel. For example, in reference to FIGS. 6A and 6B, a side elevation view of panel 102B and crate 300 is depicted. Crate 300 is configured to selectively couple to slider 104B of panel 102B using a lock pins 312A and 312B, wherein the lock pins are illustrated in an engaged state (e.g., FIG. 6A) and in a disengaged state (e.g., FIG. 6B). In this example, crate 300 includes button 302 coupled to cable 304A, wherein cable 304A is directed by one or more pulleys (e.g., pulleys 306A-B). Cable 304A is further coupled to cables 304B and 304C, which are each respectively coupled to lock pins 312A and 312B. Lock pins 312A and 312B are each spring-biased by respective springs 310A and 310B such that lock pins 312A and 312B extend from crate 300. To couple crate 300 to panel 102A, a user depresses button 302 to produce tension on cables 304A-C, which subsequently retracts lock pins 312A and 312B towards crate 300. The user then positions crate 300 on panel 102A and releases button 302 to permit the spring-biased lock pins 312A and 312B to extend and pass through respective apertures 128A and 128B on slider 104B, thereby coupling crate 300 to panel 102B. In other words, crate 300 is in a locked or engaged state, as is depicted in FIG. 6A. To decouple crate 300 from panel 102B, the user depresses button 302 to retract lock pins 312A and 312B from respective apertures 128A and 128B. In other words, crate 300 is in an unlocked or disengaged state, as is depicted in FIG. 6B. By depressing button 302, the user is permitted to remove crate 300 away from panel 102B.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A collapsible cargo slide assembly for loading and unloading cargo from a cargo area of a vehicle, the assembly comprising:
   a plurality of panels, each panel including:
      a generally planar slider having a first surface and a second surface, the second surface opposite from the first surface, the first surface configured for sliding on the cargo area of the vehicle, and
      a block of compressible material disposed on the second surface, the block configured for contact communication with the cargo; and
   a connector joining a panel and an adjacent panel among the plurality of panels,
   wherein the connector is a layer of flexible material that substantially spans across the second surface of at least the panel and the adjacent panel, the layer of flexible material located between and permanently affixed to the block and the second surface of the panel and the adjacent panel.

2. The assembly of claim 1, wherein the connector is configured to permit the panel to fold relative to the adjacent panel.

3. The assembly of claim 1, wherein the connector is configured to selectively couple the panel to the adjacent panel.

4. The assembly of claim 3, wherein the connector includes a fastener.

5. The assembly of claim 4, wherein the fastener is a zipper.

6. The assembly of claim 5, wherein the one or more apertures are configured for receiving a lock pin.

7. The assembly of claim 1, wherein each panel further comprises a protruding lip having one or more apertures, the one or more apertures configured to receive a securing device for fastening cargo to the panel.

8. The assembly of claim 7, wherein the one or more apertures are configured for receiving a lashing.

9. A collapsible cargo slide assembly for loading and unloading cargo from a cargo area of a vehicle, the assembly comprising:
at least three panels, each panel including:
a generally planar slider having a first surface and a second surface, the second surface opposite from the first surface, the first surface configured for sliding on the cargo area of the vehicle, and
a block of compressible material disposed on the second surface, the block configured for contact communication with the cargo, the block of compressible material having a coefficient of friction that is greater than a coefficient of friction of the first surface of the slider; and
a connector joining a panel and an adjacent panel among the plurality of panels, the connector being a layer of flexible material that substantially spans across the second surface of at least the panel and the adjacent panel, the layer of flexible material located between and permanently affixed to the block and the second surface of the panel and the adjacent panel.

10. The assembly of claim 9, wherein the connector is configured to selectively couple the panel to the adjacent panel.

11. The assembly of claim 10, wherein the connector includes a fastener.

12. The assembly of claim 11, wherein the fastener is a zipper.

13. The assembly of claim 9, wherein each panel further comprises a protruding lip having one or more apertures, the one or more apertures configured to receive a securing device for fastening cargo to the panel.

14. The assembly of claim 13, wherein the one or more apertures are configured for receiving a lashing.

15. The assembly of claim 13, wherein the one or more apertures are configured for receiving a lock pin.

16. A collapsible cargo slide assembly for loading and unloading cargo from a cargo area of a vehicle, the assembly comprising:
at least a first panel, a second panel, and a third panel, each panel including:
a slider having a first surface and a second surface, the second surface opposite from the first surface, the first surface configured for sliding on the cargo area of the vehicle, and
a block of compressible material received on the second surface of the slider; and
a layer of flexible material permanently affixed to the second surface of the slider and the portion of the block received by the slider, wherein the layer of flexible material is configured to couple or selectively couple each of the plurality of panels together so that the plurality of panels can be positioned in a folded and unfolded orientation,
wherein the folded orientation is such that, while the first panel, the second panel, and the third panel are coupled, the first surface of the first panel is flush against the first surface of the second panel, and a surface of the block of compressible material of the second panel is flush against a surface of the block of compressible material of the third panel.

17. The assembly of claim 16, wherein each panel further comprises a protruding lip having one or more apertures, the one or more apertures configured to receive a securing device for fastening cargo to the panel.

* * * * *